United States Patent
Kreisel et al.

(10) Patent No.: US 9,954,570 B2
(45) Date of Patent: *Apr. 24, 2018

(54) ROTATABLE DEVICE

(71) Applicants: Glenn Kreisel, Missoula, MT (US); Benjamin Bloch, Cameron, MT (US)

(72) Inventors: Glenn Kreisel, Missoula, MT (US); Benjamin Bloch, Cameron, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,837

(22) Filed: Mar. 30, 2016

(65) Prior Publication Data

US 2016/0294432 A1  Oct. 6, 2016

Related U.S. Application Data

(60) Provisional application No. 62/140,429, filed on Mar. 30, 2015.

(51) Int. Cl.
| | |
|---|---|
| *H04B 1/3888* | (2015.01) |
| *A45C 11/00* | (2006.01) |
| *H04M 1/02* | (2006.01) |
| *H04M 1/725* | (2006.01) |

(52) U.S. Cl.
CPC .......... *H04B 1/3888* (2013.01); *A45C 11/00* (2013.01); *H04M 1/0202* (2013.01); *A45C 2011/002* (2013.01); *H04M 1/72544* (2013.01); *H04M 2250/12* (2013.01)

(58) Field of Classification Search
CPC ........ H04M 1/23; H04M 1/05; H04M 1/0216; H04M 1/0235; H04B 1/3888; A45C 11/00; A45C 2011/002
See application file for complete search history.

(56) References Cited

U.S. PATENT DOCUMENTS

| | | | |
|---|---|---|---|
| 5,650,684 A * | 7/1997 | Suganuma | F16F 15/00 310/51 |
| 6,850,784 B2 * | 2/2005 | SanGiovanni | H04M 1/0256 379/433.12 |
| 6,956,564 B1 | 10/2005 | Williams | |
| 7,899,503 B2 * | 3/2011 | Chen | H04M 1/0227 455/550.1 |
| 8,463,335 B2 * | 6/2013 | Yang | H01M 2/1066 348/14.02 |
| 9,449,640 B2 | 9/2016 | Kreisel et al. | |
| 2002/0135163 A1 | 9/2002 | Derrick | |
| 2006/0121924 A1 | 6/2006 | Rengaraju | |
| 2007/0232368 A1 | 10/2007 | Feightner | |
| 2008/0306619 A1 | 12/2008 | Cerra | |
| 2011/0276333 A1 | 11/2011 | Wang | |
| 2012/0221741 A1 | 8/2012 | Frojdh | |
| 2012/0310588 A1 | 12/2012 | Lee | |

(Continued)

OTHER PUBLICATIONS

Cirrus Logic, "Ultralow Power Mobile Audio and Telephony CODEC" (CS42L73), Jul. 2013 (139 pages).

(Continued)

*Primary Examiner* — Joseph Dean, Jr.
(74) *Attorney, Agent, or Firm* — Brian J. Pangrle

(57) ABSTRACT

A device can include a processor; memory operatively coupled to the processor; a display operatively coupled to the processor; motion sensing circuitry operatively coupled to the processor; and a planar surface that includes a projection where the projection defines an axis of rotation of the device.

20 Claims, 17 Drawing Sheets

(56) References Cited

U.S. PATENT DOCUMENTS

2014/0073391 A1  3/2014  Lin
2015/0348581 A1  12/2015  Kreisel et al.

OTHER PUBLICATIONS

Bosch, BMA220, Digital, triaxial acceleration sensor, Data Sheet, Aug. 2011 (54 pages).
STMicroelectronics, LIS331DLH, MEMS digital output motion sensor, 2009 (38 pages).
OXO, 11" Turntable, 2013 (4 pages).
Apple, Case Design Guidelines for Apple Devices, Release R6, 2013 (65 pages).
Baecher et al., "Spin-It: Optimizing Moment of Inertia for Spinnable Objects", ACM Conference on Computer Graphics & Interactive Techniques (SIGGRAPH) 2014 (10 pages).
Harihar (Shake Torch Flash LED light 1.5 Android app page, accessed on Jun. 18, 2015 at http://shake-torch-flash-ledlight.android.informercom/1.5/, app published Feb. 1, 2014).
Bryan et al. ("Two Turntables and a Mobile Phone" NIME'II, May 30-Jun. 1, 2011, Oslo, Norway; retrieved from https://ccrma.stanford. eduhnjb/research/tu rntable/N I M E2011-turntable.pdf on Jun. 20, 2015).

* cited by examiner

ROTATABLE DEVICE

RELATED APPLICATIONS

This application claims priority to and the benefit of a U.S. Provisional Application having Ser. No. 62/140,429, filed 30 Mar. 2015, which is incorporated by reference herein.

TECHNICAL FIELD

Subject matter disclosed herein generally relates to media devices and associated equipment and techniques.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
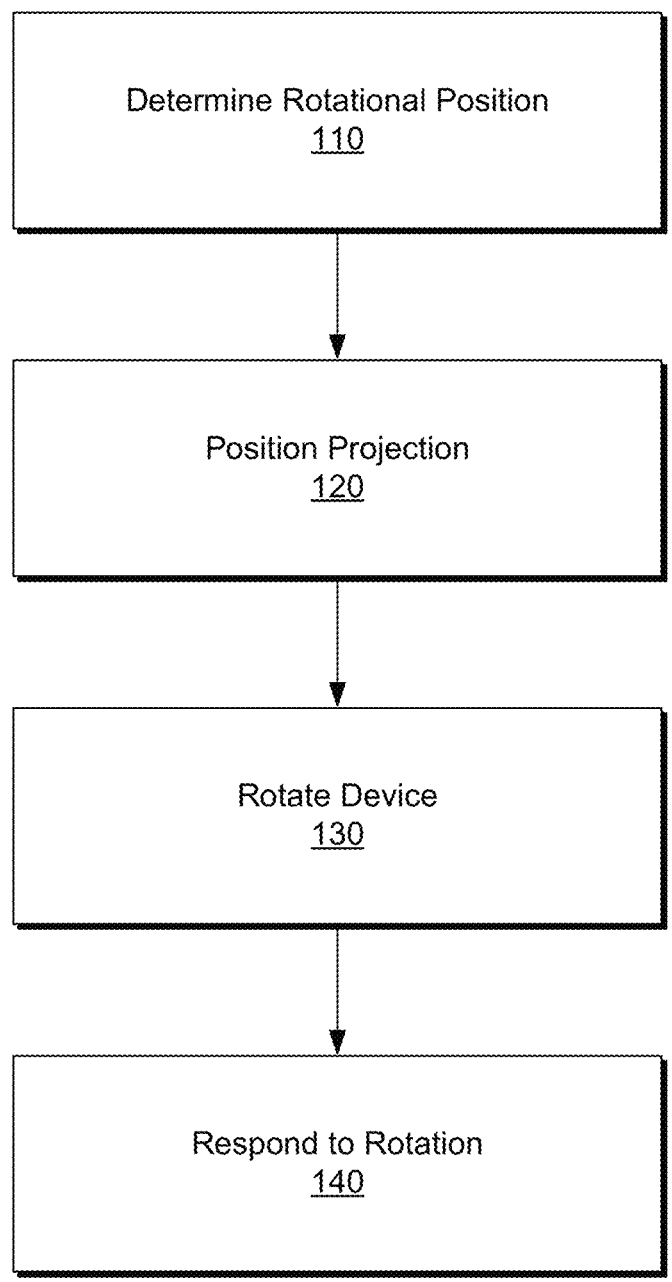
FIG. 1 illustrates views of an example of a method.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As an example, a device may be rotatable. For example, a device may include a projection that extends outwardly from a surface of the device, which may be, for example, a planar surface. In such an example, the projection, as positioned with respect to the device, may provide a contact surface that allows the device to rotate thereabout. For example, a projection may contact a surface of a table such that the device can rotate on the table (e.g., where the projection provides a point of contact and defines, for example, a rotational axis of the device).

As an example, a projection may be fixed to a device. As an example, a projection may be fixed to a case for a device. As an example, a projection may be integral to a device. As an example, a projection may be integral to a case for a device. As an example, a projection may be constructed of a material such as a metal, an alloy, a composite material, a polymer, etc. As an example, a projection may include a core material (e.g., as a solid core or as a shell) and a coating, which may provide a coefficient of friction that facilitates spinning of a device about an axis defined by the projection. For example, consider a core material with a coating that reduces friction of a projection (e.g., with respect to a surface that the projection contacts). As an example, a projection may include a "tip", for example, formed of a durable material that may form a "point" that can facilitate rotation of a device about the tip, the point, etc. (e.g., consider a hard material such as an industrial diamond set in a projection).

As an example, a device may be rotatable and may include circuitry that can render information to a display, an audio output, etc. Such information may be related to a game, music, etc. As an example, a game may use a rotatable device as a "spinner". In such an example, the device may respond at least in part to information sensed by sensor circuitry, which can detect movement of the device (e.g., consider an accelerometer, a gyroscope, etc.).

Turntablism has been described as the art of manipulating sounds and creating music using direct-drive turntables and a DJ mixer. The term turntablist has been used to describe the difference between a DJ who just plays records and one who performs by touching and moving the records, stylus and mixer to manipulate sound. A "hiphop/scratch" artist may play a record like an electronic washboard with a phonographic needle as a plectrum to produce sounds that may be unique (e.g., difficult to reproduce). To such an artist, the record player may be considered to be a musical instrument. Some turntablist DJs use turntable techniques like beat mixing/matching, scratching and beat juggling. Some turntablists seek to have themselves recognized as traditional musicians capable of interacting and improvising with other performers.

As an example, a rotatable device may include circuitry to perform one or more actions associated with turntablism. As an example, a rotatable device may render audio and/or video information based at least in part on a rotational position and/or rotation with respect to time (e.g., rotational speed, rotational acceleration, etc.).

As an example, a projection may be a small raised, rounded protrusion (e.g., of appropriate size, shape and material) affixed to a surface of a smart device that enables the device to be rotatable, for example, when placed on a surface (e.g., a planar surface). In such an example, energy imparted to the device, for example, via twisting, flicking, pushing, etc., may make the device rotate.

As an example, spinning motion of a device may be caused by human force and/or another mechanism(s) that generates torque, force, and/or momentum (e.g., air, motor, vibration, etc.).

As an example, a projection may be positioned at a balance point of a device, which may be, for example, a rectangular device. As an example, assuming a relatively homogenous density or distribution of mass, a projection may be positioned approximately halfway between a length and a width of a rectangular device (e.g., to enable the device to spin like a top, a disk, a record, or a game spinner, at high rpms, low rpms, etc.).

As an example, a device may include one or more algorithms (e.g., implemented via hardware, software, hardware and software) such that one or more actions may occur responsive to spinning of the device, halting spinning of the device, receipt of a touch, receipt of audio (e.g., a voice command), etc. As an example, a sensor or sensors may include one or more accelerometers, gyroscopes, touch screen, microphone, etc. As an example, sensed information may be used to time, cause, etc., rendering and/or manipulation of sound, video, and/or animation, for example, based on relative velocity, speed, and direction of the spin (e.g., or one or more other parameters).

As an example, a projection may be placed centrally on a backside of a device (e.g., at or near the most evenly balanced point). As an example, a projection may include an adhesive (e.g., a glue, etc.). As an example, a projection may be magnetic, for example, to adhere to a material. As an example, a projection may be removable. As an example, a projection may be replaceable. As an example, a projection may be adhered to a device, removed from the device and re-adhered to the device.

FIG. 1 shows an example of a method 100 that includes a determination block 110 for determining a rotational position of a device, a position block 120 for positioning a projection on the device (e.g., or a case thereof), a rotate block 130 for rotating the device (e.g., about the projection) and a response block 140 for responding to the rotation.

In physics, the center of mass of a distribution of mass in space may be defined as a point where the weighted relative position of the distributed mass sums to zero and where the distribution of mass is balanced around the center of mass and the average of the weighted position coordinates of the distributed mass defines its coordinates. In the case of a single rigid body, the center of mass is fixed in relation to the body, and if the body has uniform density, the center of mass will be located at the centroid. A center of gravity may be defined as the point in a body around which resultant torque due to gravity forces vanishes. Near the surface of the Earth, where the gravity acts downward as a parallel force field, the center of gravity and the center of mass of an arbitrary body can be the same.

As an example, a method to locate the three-dimensional coordinates of the center of mass of an object can include supporting the object at three points and measuring the forces, $F_1$, $F_2$, and $F_3$ that resist the weight of the object, $W=-Wk$ (k is the unit vector in the vertical direction). For example, let $r_1$, $r_2$, and $r_3$ be the position coordinates of the support points, then the coordinates R of the center of mass satisfy the condition that the resultant torque is zero, $$T=(r_1-R)\times F_1+(r_2-R)\times F_2+(r_3-R)\times F_3=0,$$

or $$R\times(-W\vec{k})=r_1\times F_1+r_2\times F_2+r_3\times F_3.$$

The foregoing equation(s) yields the coordinates of the center of mass R* in the horizontal plane as, $$R^* = \frac{1}{W}\vec{k} \times (r_1 \times F_1 + r_2 \times F_2 + r_3 \times F_3).$$

As an example, the center of mass can lie on a vertical line L, given by $$L(t)=R^*+t\vec{k}.$$

As an example, three-dimensional coordinates of the center of mass may be determined by performing a method twice with an object positioned so that forces are measured for two different horizontal planes through the object. In such an example, the center of mass can be determined as an intersection of two lines $L_1$ and $L_2$ (e.g., from the two iterations, etc.).

As an example, a method can include determining a geometric center of a device and/or determining a center of mass (e.g., or center of gravity) of a device and positioning a projection at a location at the geometric center or at the center of mass (e.g., or center of gravity).

Figure 2:
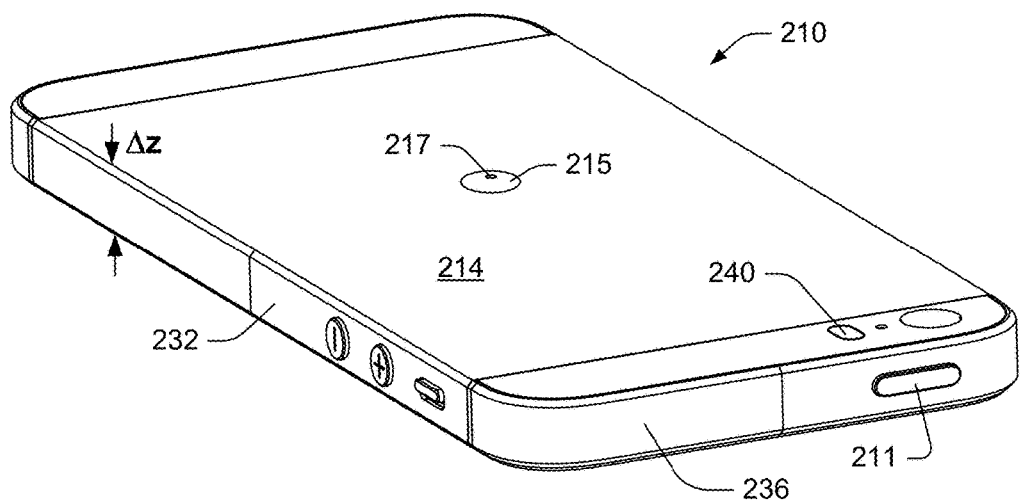
FIG. 2 illustrates views of an example of a device.
Figure 2:
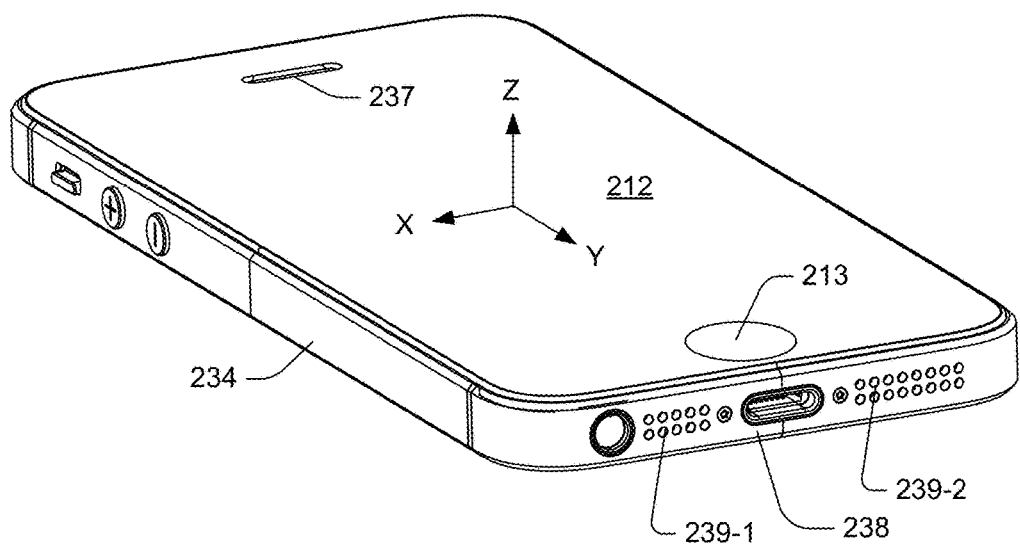

FIG. 2 shows two perspective views of an example of a device 210 that may be seated in the recess 130 of the turntable 110 of FIG. 1. As shown, the device 210 includes an activation switch 211, an upper surface 212, another activation switch 213, a lower surface 214 (e.g., a planar surface), a projection 215 (e.g., that projects outwardly from the lower surface 214), side surfaces 232 and 234 and end surfaces 236 and 238. As shown, the device 210 also includes one or more speaker ports 237, 239-1 and 239-2 as well as a flash unit port 240 (e.g., a lens, etc.). In the example of FIG. 2, the device 210 also includes a jack that may be a physical jack for output of audio signals; noting that wireless circuitry may be included for wireless output of audio information.

As an example, the device 210 of FIG. 2 may be described with respect to a coordinate system such as a Cartesian coordinate system (e.g., with x, y, z coordinates). As an example, an electronic device may include an axis that may be considered a central axis. Such an axis may be normal to a plane defined by the device, for example, defined by a display of the device. As an example, when positioned on a surface such that the projection 215 contacts the surface, the device 210 may rotate about a rotational axis that is defined by the projection 215 (e.g. a contact point between the projection 215 and the surface).

As an example, geometric center may be defined for the device 210 and, for example, the projection 215 located at or near the geometric center (e.g., on the lower surface 214 at an x,y position of the geometric center). As an example, a center of mass may be defined for the device 210 and, for example, the projection 215 located at or near the center of mass (e.g., on the lower surface 214 at an x,y position of the center of mass). As an example, a mass center may be at or near a geometric center. As an example, motion sensing circuitry may be at or offset from a geometric center. As an example, a device may be supported by a projection and rotated where such rotation may correspond to a rotational axis that is defined by the projection, which may optionally be at a geometric center of the device or offset from a geometric center of the device. As described herein, a "plane" is a geometrical plane (e.g., not an abbreviation for an airplane). For example, the device 210 may be substantially planar and may be rotated within a geometrical plane.

Figure 3:
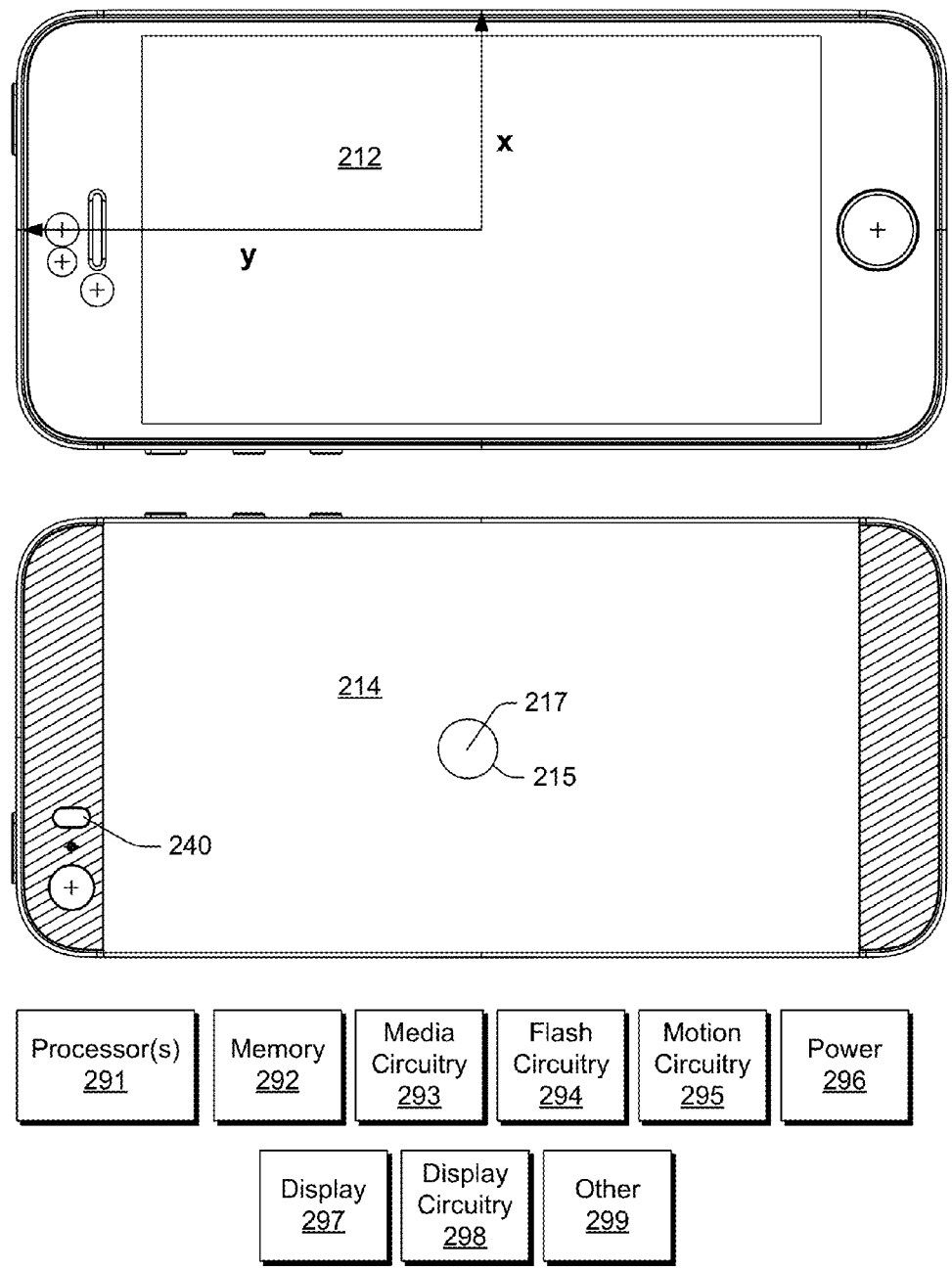
FIG. 3 illustrates views of the device FIG. 2.

FIG. 3 shows additional views of the device 210 of FIG. 2. As an example, the device 210 may be an iPhone™ cellular phone of Apple Corporation, Cupertino, Calif. (e.g., consider an iPhone 5 or other iPhone cellular phone or other "smart phone" such as an ANDROID® OS smart phone, etc.).

FIG. 3 shows various examples of components that may be included in an electronic device such as the device 210. For example, an electronic device may include one or more processors 291, memory 292, media circuitry 293, flash circuitry 294, motion circuitry 295 (e.g., motion sensing circuitry), power 296 (e.g., power circuitry, a battery, etc.), a display 297, display circuitry 298 and other circuitry or components 299. As an example, circuitry may include one or more of hardware, software, firmware, etc.

As an example, a device may include an operating system that can establish an operating system environment that is suitable for execution of applications (e.g., instructions stored in memory, etc.). As an example, a device may include one or more application programming interfaces (APIs). As an example, a call may be made to an API where the call may include one or more parameters. Such a call may instruct a device to perform an action and optionally return information. For example, an application may receive information (e.g., via circuitry, user input, etc.) and formulate an API call that calls for a device to perform an action (e.g., render audio, render video, trigger a flash via flash circuitry, receive sensor data, set a parameter value, etc.). As an example, consider the iOS APIs that may operatively couple with one or more services.

As an example, consider core audio services that may be layered on top of a hardware abstraction layer (HAL). As an example, audio signals may pass to and from hardware through the HAL. An application may access the HAL using, for example, audio hardware services in a core audio framework. As another example, consider a Core MIDI (Musical Instrument Digital Interface) framework that can provide interfaces for MIDI data.

As another example, consider a core motion framework that can provide an application access to motion data from motion sensing circuitry. Such a framework may support access of raw and/or processed accelerometer data, for example, using block-based interfaces. As an example, consider a device with a gyroscope where a motion framework provides for retrieval of raw gyro data, processed data, etc. A motion framework may allow for accelerometer and/or gyro-based data one or more applications that can utilize motion as input. As a particular example, consider an instance of a CMAccelerometerData class that represents an accelerometer event, which may be a measurement of acceleration along multiple spatial axes at a moment of time (e.g., typedef struct {double x; double y; double z;} CMAcceleration). Various examples of resources for the iOS may be available, for example, via Apple Inc., Cupertino, Calif. (see, e.g., developer.apple.com/library/ios/).

As an example, an application executable on an electronic device may be coded in accordance to one or more software frameworks. As an example, code may conform to, for example, the Swift software framework (Apple Inc., Cupertino, Calif.), which is an object-oriented programming language that targets iOS and OS X. The Swift software framework includes getter/setter syntax akin to that of C#, the type after variable named and colon akin to Pascal-derived languages, string interpolation as in various scripting languages (e.g., using \(foo) versus Groovy's ${foo}), a question mark suffix after a type to denote it can be nullable akin to Ceylon, range operators akin to Ruby (e.g., noting that code for an application may be that of one or more software frameworks such as, for example, Swift, C, Groovy, Ceylon, Ruby, etc.). The Swift software framework may be utilized for direct access to the Foundation framework (e.g., base layer of objective-C classes) and the UIKit framework (e.g., classes to construct and manage an application's user interface).

As an example, a device may include one or more of audio codec circuitry, audio chip circuitry, etc. As an example, consider one or more components marketed by Cirrus Logic (e.g., Apple 338S1077 Audio CODEC and Apple 338S1117 Cirrus Audio Chip). As an example, an audio codec may include one or more stereo codecs and/or multichannel codecs (e.g., for surround sound applications). As an example, a component may include an analog to digital converter and/or a digital to analog converter.

As an example, a device can include a processor and memory accessible by the processor. As an example, a device can include a display and display driver circuitry for rendering information to the display. As an example, a device can include a touch-sensitive display operable via one or more touch-sensing techniques (e.g., capacitive finger touch, stylus touch, etc.). As an example, one or more computer-readable media may include processor-executable instructions that may be stored in memory and executable by a processor to cause a device to perform one or more actions. As an example, a computer-readable media may be a storage media that is non-transitory. As an example, various techniques, methods, etc. described herein may be implemented via a device that includes a processor and memory. As an example, a device may include circuitry that can receive media data and render media data. For example, a device may receive a song file as media data and include media player circuitry that can render the media data as electronic signals for receipt by a transducer such as a speaker.

As an example, a device may include rendering one or more graphical user interfaces (GUIs) to a display that may be a touch-sensitive display. As an example, a GUI may include one or more controls that may be actuated via touch or other input (e.g., voice command, motion gesture, etc.). As an example, a device may be rotated on a projection, seated in a turntable, etc., and operated to render a GUI where one or more controls may be selected via rotation of the device, rotation the device via the turntable, etc. For example, consider a GUI that illustrates options arranged about an arc. In such an example, at least a portion of the GUI may remain stationary while rotation causes a pointer (e.g., a cursor) to rotate to one or more of the options, which may be selected, for example, via a tap to the device, the turntable, etc., a back-n-forth rotational gesture to the device, the turntable, etc.

As an example, a device can include a projection where the device responds to input via rotation of the device about an axis defined by the projection. As an example, the device may be a gesture device, for example, where gestures input via rotation of the device are sensed by the device and where the device can perform one or more actions based at least in part on the sensed gesture input.

As to communications, a device may include circuitry such as Bluetooth® circuitry and/or other wireless communication circuitry (e.g., AirPlay circuitry (Apple Inc., Cupertino, Calif.), etc.).

As an example, an electronic device may be configured with motion sensing circuitry to sense one or more of yaw, roll and pitch. As an example, an electronic device may be supported by a projection and rotated about an axis defined by the projection. In such an example, the electronic device may be seated flat with respect to gravity in that a display of the device defines a plane and where rotation of the device maintains the device substantially in the plane.

As an example, an electronic device may include motion sensing circuitry that is offset from the geometric center of a device. As an example, motion sensing circuitry such as an accelerometer may be positioned at a radius and may rotate a distance about an axis (e.g., rotational axis) of a projection of a device.

As an example, a device may be provided as part of a kit that includes a speaker unit. As an example, a speaker unit may include Bluetooth® technology circuitry for wireless communication (e.g., handshakes, etc.) and receipt of information such as audio information. As an example, the Bluetooth® technology circuitry may provide a wireless range of up to about 33 feet (10 m) or more, it may be Bluetooth® compliant, it may support enhanced data rate (EDR), it may support one or more profiles such as, for example, the Advanced Audio Distribution Profile (A2DP), Hands-Free Profile (HFP), Headset Profile (HSP), and Serial Port Profile (SPP). A speaker unit may include MyTALK framework capabilities (e.g., for Windows® OS, Mac® OSX, etc.). As an example, circuitry of a speaker unit may be configured for simultaneous multipoint where it can operatively couple with multiple devices for transmissions.

As an example, a speaker unit may include acoustic drivers, passive bass radiators, a built-in microphone, an IEEE 1329 Type 1-compliant speakerphone, a stereo input jack, a USB port (e.g., for updating on the MyTALK framework). As an example, a speaker unit may include features of one or more Jambox® speaker units such as the Mini Jambox® speaker unit and/or the Big Jambox® speaker unit (e.g., wireless speaker) marketed by Jawbone (San Francisco, Calif.). The Big Jambox® speaker unit has a length of about 10" (256 mm), a width of about 3.1" (80 mm), a height of about 3.6" (93 mm) and a weight of about 2.7 lbs (1.23 kg) and includes battery power for up to about 15 hours of continuous play where battery life may be displayed on a compatible device operatively coupled with the unit (e.g., consider the device 210). As an example, the device 210 may optionally render battery life to a display of the device 210, for example, consider a low battery signal that alerts a user that a coupled wireless speaker unit is low on power.

As an example, a device can include an audio codec that may be, for example, include an integrated, low-power smart audio codec that can serve as a mobile audio distribution network incorporating multiple digital/analog converters (DACs) and an ADC, for example, with ground centered headphone, line and speaker amplifiers for smartphone and portable applications. As an example, such an audio codec may include three asynchronous bidirectional serial ports with integrated asynchronous sample rate converters (AS-RCs) that may accept a range of incoming audio sample rates, for example, to feed an integrated digital mixing engine (e.g., consider the Cirrus Logic CS42L73 audio codec, the datasheet of which is incorporated by reference herein "CS42L73_F1.pdf"). Such an engine may be configured to overlay (e.g., optionally simultaneously) and distribute digital audio from multiple sources to one or more its integrated audio nodes, for example, to provide routeability within an electronic device.

As an example, circuitry can include a digital mixer that can mix and route inputs (e.g., analog inputs to ADC, digital microphone, serial ports, etc.) to outputs (e.g., DAC-fed amplifiers, serial ports, etc.). As an example, a digital mixer may include features for independent attenuation on individual mixer input for individual output. As an example, processing along one or more output paths from a digital mixer to one or more DACs can optionally include volume adjustment and, for example, mute control. As an example, a peak-detector may be implemented to automatically adjust one or more volume levels via a programmable limiter. As an example, circuitry such as audio codec circuitry may be controllable via one or more busses. For example, consider an I²C bus that may be coupled to an I²C interface of audio codec circuitry such that the audio codec circuitry may respond to instructions executed by a processor (e.g., according to one or more applications, etc.). As an example, media player circuitry may include audio codec circuitry. As an example, media player circuitry may include an application executable via a processor that can instruct circuitry such as audio codec circuitry.

As an example, circuitry such as audio codec circuitry may operatively couple with wireless communication circuitry via lines such as clock and data lines (e.g., XSP_LRCK, XSP_SCLK, XSP_SDIN, XSP_SDOUT). As an example, an audio codec may be operatively coupled to one or more serial ports, which may be independent (e.g., consider the XSP, ASP, and VSP serial ports of the Cirrus Logic CS42L73 audio codec) and may be configured to communicate audio (e.g., and voice) data to and from components such as, for example, an application processor, a Bluetooth® transceiver, a cell-phone modem, etc.

I²S, also known as Inter-IC Sound, Integrated Interchip Sound, or IIS, is an electrical serial bus interface standard that can be implemented for operatively coupling one or more digital components with respect to audio information. For example, it may be implemented to communicate PCM audio data between integrated circuits in an electronic device. The I²S bus can separate clock and serial data signals, which may result in a lower jitter compared to communications techniques that recover the clock from a data stream.

As an example, an application may be stored in memory of a device and executed in an OS environment established by the device where the application may include statements that can make one or more API calls. As an example, such an application may couple motion, audio, video, flash, etc. For example, motion may control audio, motion may control flash, motion may control video, audio may control flash, audio may control video, etc. As an example, where a device includes a touchscreen, graphical user interfaces may be rendered to the touchscreen that can include graphical controls actuatable via touch, which may be single point touch, multipoint touch, gesture touch, etc. As an example, a device may be configured to transmit audio information to a speaker unit.

As an example, motion sensed by a device may control processing of audio information where processed audio information may be transmitted wirelessly to a speaker unit to generate acoustic waves. As an example, a device may include an application that can transmit information to one or more effects units such as lighting units, pyrotechnic units, etc. As an example, consider bumping of the device to cause flashing of one or more lights (e.g., LED, laser, spots, etc.) controlled via a base unit that can receive control signals wirelessly from the device (e.g., directly and/or indirectly). A turntablist may use such a system to put on an audio and visual show (e.g., a dance club style show). A person playing a game may use a device that includes a projection to play the game (e.g., to spin the device, to stop the device from spinning, to bump the device, etc.).

As an example, a device can include a processor, memory and motion sensing circuitry. As an example, the motion sensing circuitry may include multi-axis motion sensing circuitry such as one or more of a gyroscope and an accelerometer (e.g., consider a STMicroelectronics L3G4200D unit, a Bosch BMA220 unit, etc.). As an example, the motion sensing circuitry may include a tri-axial, low-g acceleration sensor with digital interfaces and/or a three-axis gyroscope.

As an example, a device may receive information via a motion sensor and respond by issuing one or more triggers that act to trigger a light, a special effect, a pyrotechnic, etc. As an example, a light may be a laser light, a stage light, an LED light or display, etc.

As an example, one or more Bluetooth® technology enabled devices (e.g., headsets, speakers, etc.) may support an A2DP profile and appear as AirPlay receivers when paired with an iOS device or other device; noting that Bluetooth® technology may operate via a device-to-device protocol (e.g., one that does not require on a wireless network access point).

As an example, a device may be inductively charged. Inductive charging (or "wireless charging") uses an electromagnetic field to transfer energy between two objects. Inductive charging can be implemented using a charging station where energy is sent through an inductive coupling to an electrical device, which can then use that energy to charge batteries or run the device.

Charging circuitry can include an induction coil that can create an alternating electromagnetic field from within a charging base station and a second induction coil in/operatively coupled to an electronic device that can take power from the electromagnetic field and, for example, converts to electrical current to charge a battery, power the device, etc. Two induction coils in proximity can form an electrical transformer. As an example, greater distances between sender and receiver coils may be achieved where an inductive charging system implements resonant inductive coupling.

As an example, an electronic device may be fit with charging circuitry, optionally as a charging case. As an example, a system may include circuitry such as that of one or more of the Duracell® Powermat system (Procter & Gamble, Cincinnati, Ohio), the iQi Mobile charger system (iQi Mobile, London, UK), etc. The iQi Mobile charger system for the iPhone device includes a relatively thin receiver (e.g., about 0.5 mm) and a flexible ribbon cable (e.g., about 1.4 mm) that runs to a lightning connector, allowing the receiver to remain plugged in when folded behind the device. The Duracell® Powermat system for the iPhone device includes the AccessCase case with an inductive coil that sits just below the device's lightning port. As an example, a case that includes a projection may optionally be a charging case (e.g., include one or more circuits for receipt of energy, etc.). In such an example, the case may be a "balanced" case, for example, a case with a distribution of mass that can act to balance a device as received by the case such that the device may rotate about a projection where the rotational axis may correspond to a geometric center of a display. As an example, a device may "locate" a center of a graphic rendered to a display of the device such that the graphic center corresponds to a rotational axis as determined at least in part by a projection of the device. As an example, a device may be configured to minimize "jitter" of a graphic rendered to a display of the device while the device is rotating about an axis (e.g., determined by a surface of a projection of the device, a case that receives the device, etc.).

As an example, an electronic device may include or be fit with receiver circuitry for inductive charging. As an example, a component that includes a surface that can rotatably support a device that includes a projection may include circuitry that can generate electromagnetic fields for inductive charging.

As an example, inductive charging circuitry may provide for powering/charging an electronic device where the electronic device is stationary and/or moving (e.g., rotating via a turntable, rotating via a projection, etc.).

As an example, a device may include a processor, memory and instructions stored in memory that can be executed by the processor to control rendering of media. In such an example, control may include implementation of motion sensing circuitry and/or audio codec circuitry. As an example, control may include transmitting signals via one or more busses. For example, consider receiving information from motion sensing circuitry via a bus and transmitting information to audio codec circuitry via a bus. In such an example, a bus may be an I²C bus or other type of bus.

Figure 4:
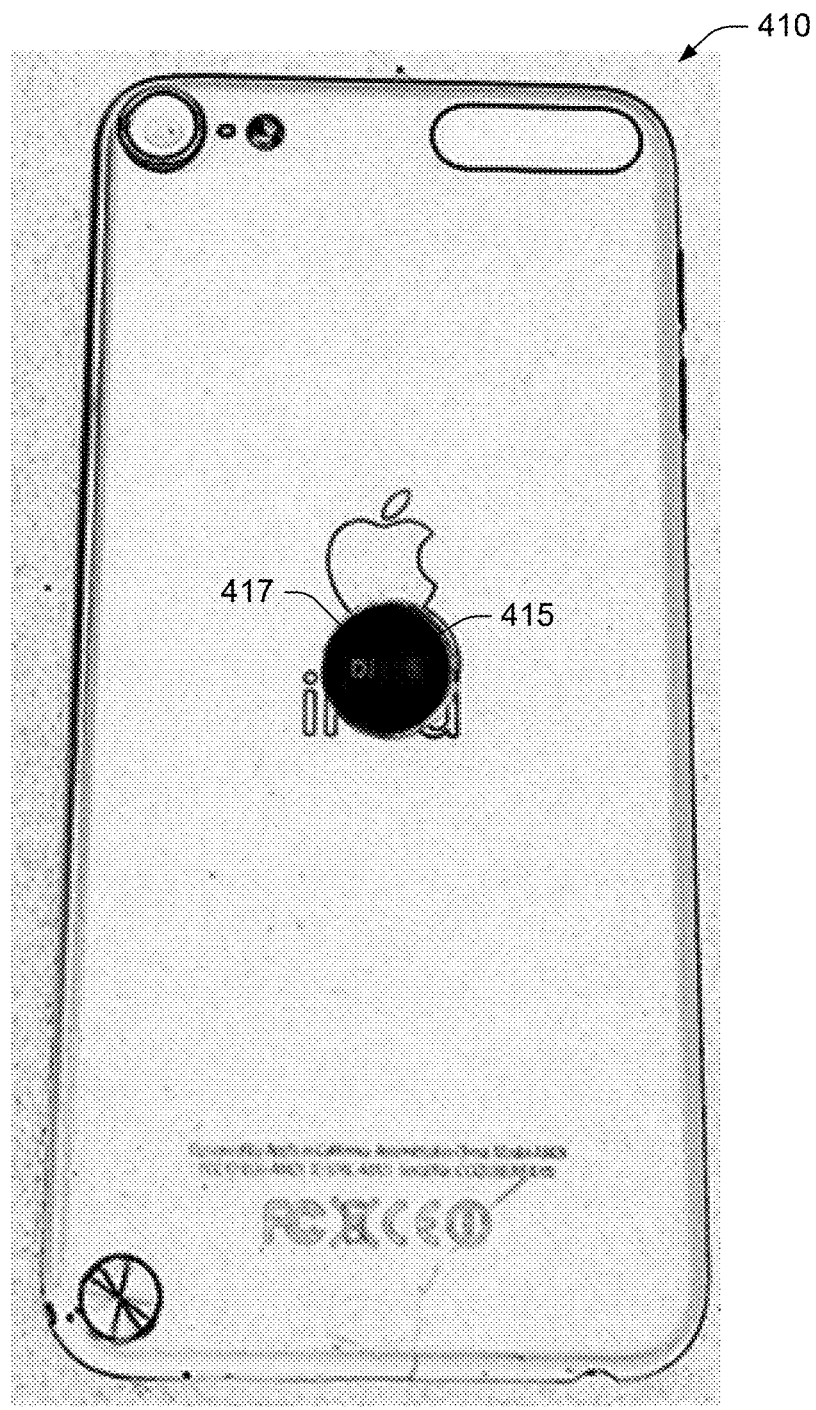
FIG. 4 illustrates an example of a projection and device.

FIG. 4 shows an example of a device 410 with an example of a projection 415 that is positioned on a back side of the device where the other side of the device, the front side, includes a display. In the example of FIG. 4, the projection can include a graphic, which may be a logo, etc. As shown, the projection 415 can include a point 417 that can define an axis of rotation of the device 410.

Figure 5:
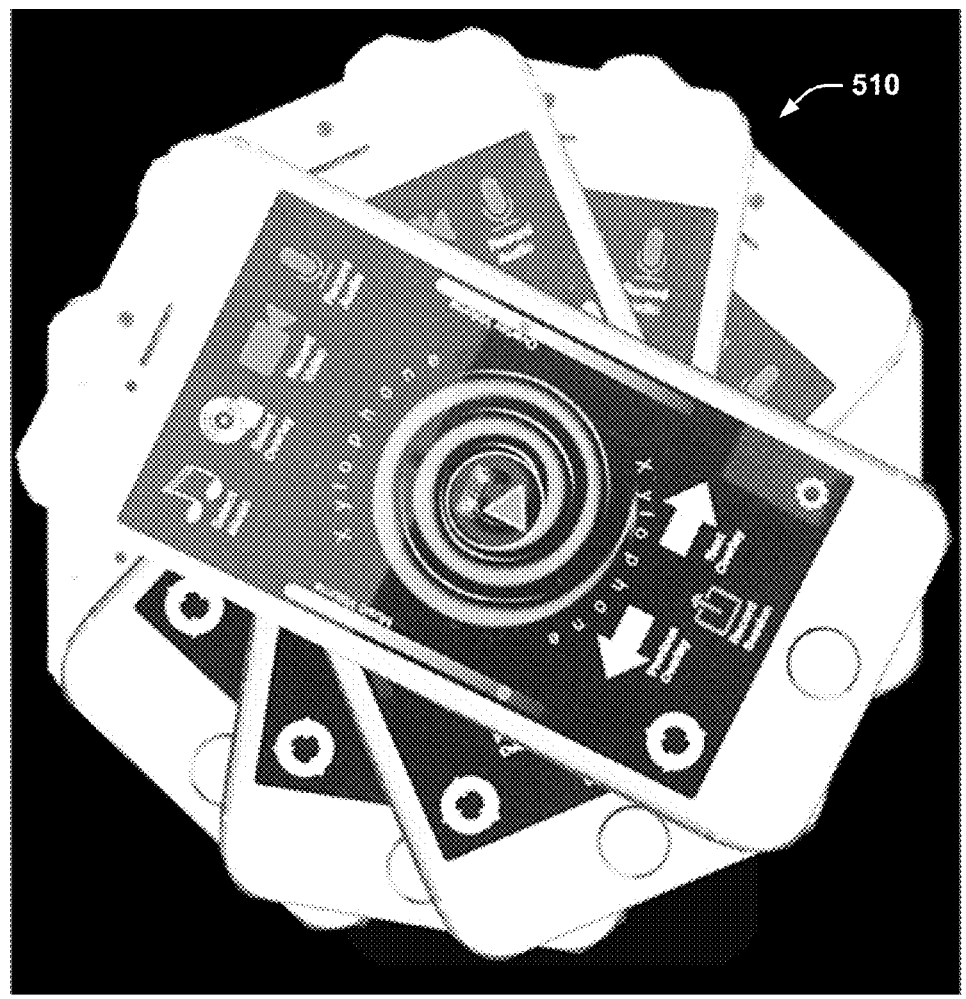
FIG. 5 illustrates an example of a projection and device.

FIG. 5 shows an example of a device 510 in multiple overlaid positions as the device 510 may be rotated about an axis defined by a projection.

Figure 6:
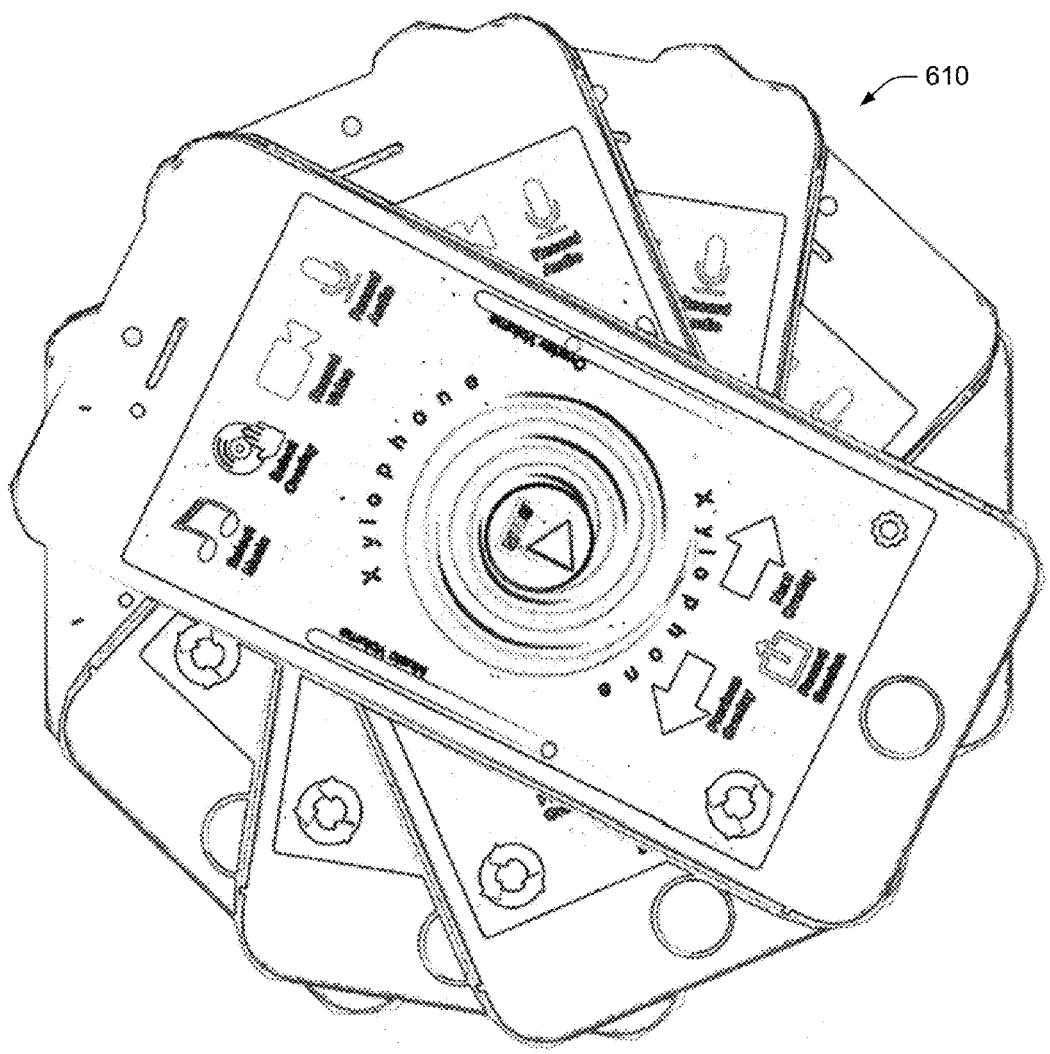
FIG. 6 illustrates an example of a projection and device.

FIG. 6 shows an example of a device 610 in multiple overlaid positions as the device 610 may be rotated about an axis defined by a projection.

Figure 7:
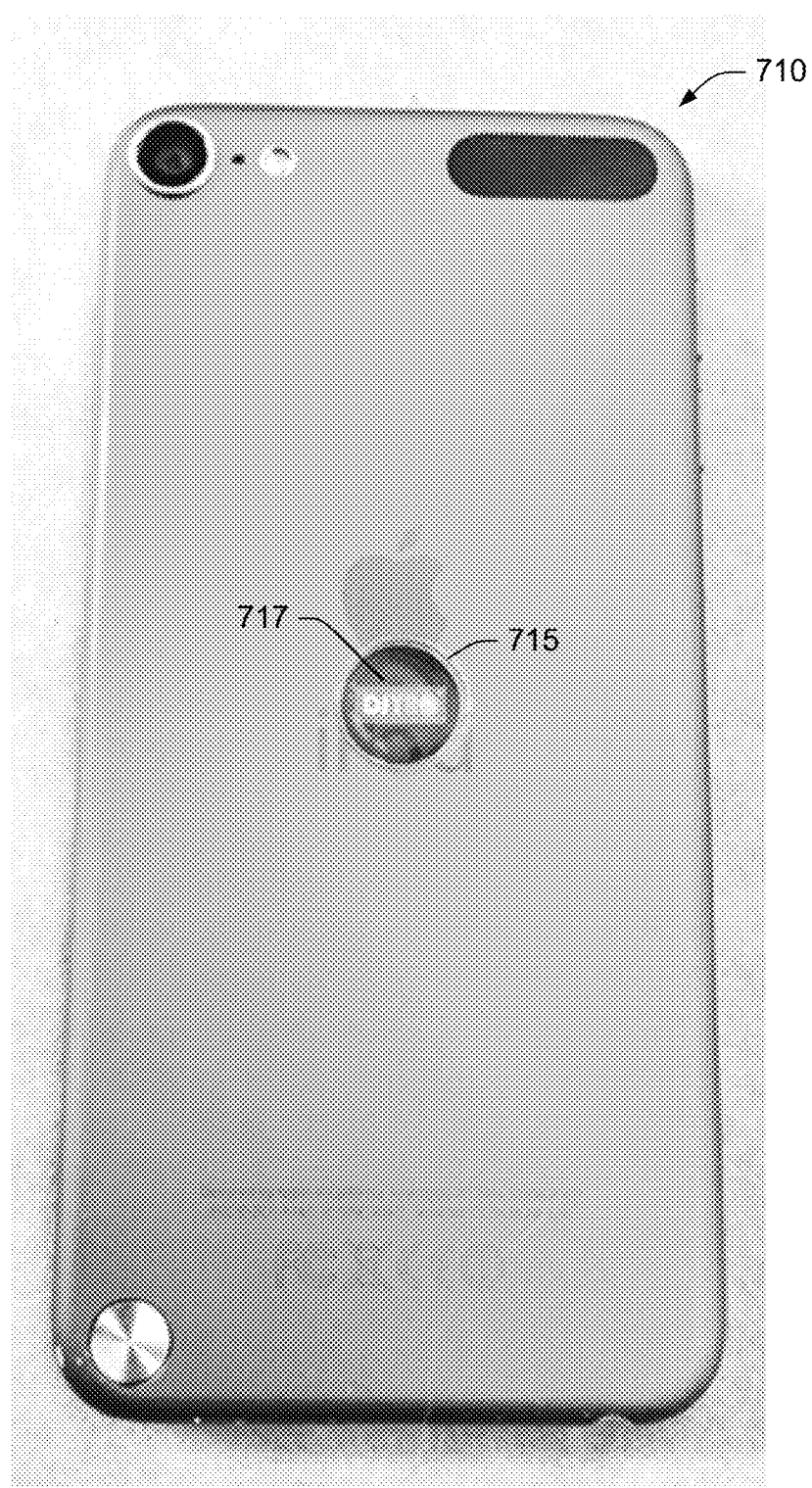
FIG. 7 illustrates an example of a projection and device.

FIG. 7 shows an example of a device 710 with an example of a projection 715 that is positioned on a back side of the device where the other side of the device 710, the front side, includes a display. In the example of FIG. 7, the projection 715 includes a graphic, which may be a logo, etc. As shown, the projection 715 can include a point 717 that can define an axis of rotation of the device 710.

Figure 8:
FIG. 8 illustrates an example of a projection and device.

FIG. 8 shows an example of a device 810 with an example of a projection 815 that is positioned on a back side of the device 810 where the other side of the device 810, the front side, includes a display. As shown, the projection 815 can include a point 817 that can define an axis of rotation of the device 810.

Figure 9:
FIG. 9 illustrates an example of a projection and device.
Figure 10:
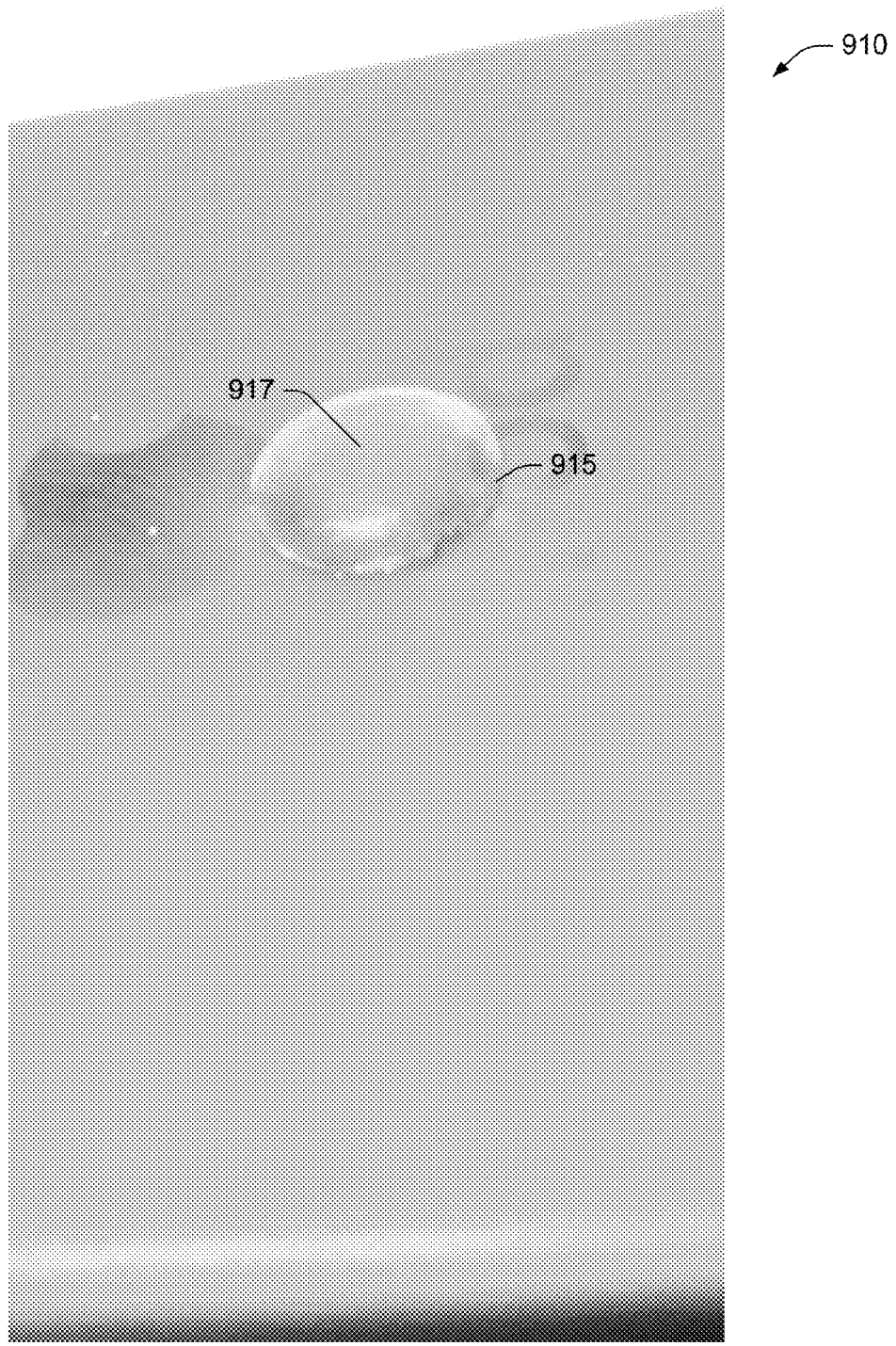
FIG. 10 illustrates an example of a projection and device.

FIGS. 9 and 10 show an example of a device 910 with an example of a projection 915 that is positioned on a back side of the device 910 where the other side of the device 910, the front side, includes a display. As shown, the projection 915 can include a point 917 that can define an axis of rotation of the device 910.

Figure 11:
FIG. 11 illustrates an example of a projection and device.
Figure 12:
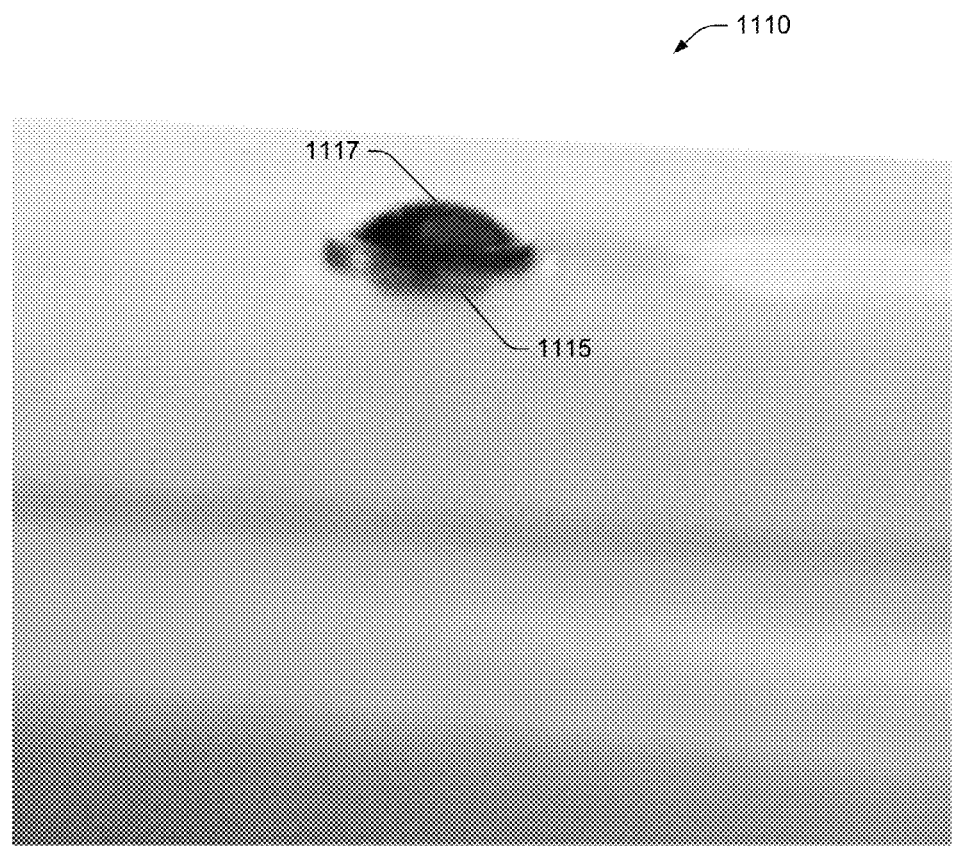
FIG. 12 illustrates an example of a projection and device.

FIGS. 11 and 12 show an example of a device 1110 with an example of a projection 1115 that is positioned on a back side of the device 1110 where the other side of the device 1110, the front side, includes a display. As shown, the projection 1115 can include a point 1117 that can define an axis of rotation of the device 1110.

Figure 13:
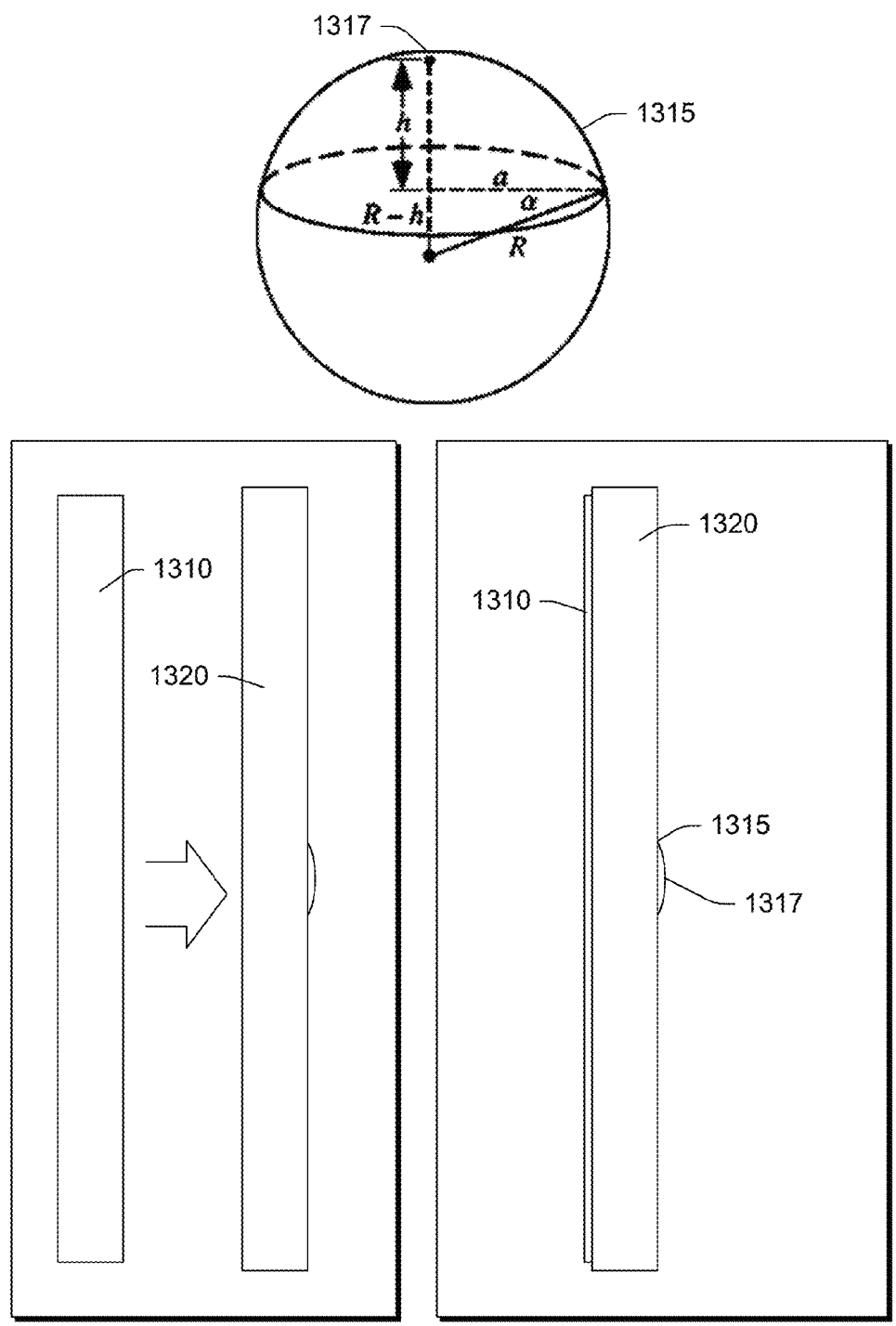
FIG. 13 illustrates an example of a device with a case.

FIG. 13 shows an example of a device 1310 and an example of a case 1320 that includes an example of a projection 1315 where the case 1329 may receive the device 1310 (e.g., at least in part receive the device 1310 such that the case 1320 is in contact with the device 1310 to secure the case 1320 to the device 1310). In the example of FIG. 13, a geometric diagram of a spherical cap is show, which illustrates various parameters that may define a spherical cap. For example, consider height (h), which is a fraction of a radius (R) of a sphere and which includes a base radius (a). Reference numerals indicate that the projection 1315 can, as an example, be a spherical cap or include a portion that is a substantially spherical cap and can include a point 1317 that can define an axis of rotation.

A spherical cap may be defined as the region of a sphere which lies above (or below) a given plane. As an example, where a plane passes through the center of the sphere, the cap may be referred to as a hemisphere. As an example, a projection may be defined at least in part by a spherical cap. As an example, a projection may have another shape, for example, consider a portion of an ellipsoid (e.g., a cap of a triaxial ellipsoid).

As an example, a device that includes a projection may be characterized as a type of top (e.g., spinning top or spintop). Such a device may be spun where the motion of which causes it to remain balanced on its projection (e.g., a surface or "tip" of the projection), for example, due at least in part to inertia.

As an example, a device may be a type of asymmetric top, for example, where there is at least some amount of geometric, density, etc. asymmetry of the device (e.g., and/or a case of the device).

An article by Baecher et al., "Spin-It: Optimizing Moment of Inertia for Spinnable Objects", ACM Conference on Computer Graphics & Interactive Techniques (SIGGRAPH) 2014, is incorporated by reference herein.

For spinning tops, the center of mass may lie on a spinning axis a, otherwise there can be an unbalanced external torque $|\tau|=Mgd$ relative to p(a). For slower angular velocities, a precession angle between rotational (vertical axis) and spinning axes becomes larger (c). For smaller l, the gravitational torque $|\tau|=Mg/\sin \Theta$ is smaller for equal precession, resulting in a longer spin.

As an example, a case may include a mass distribution that can increase the ability of a device to spin or, for example, to spin about a more geometric center (e.g., consider a geometric center of a display of a device). For example, consider a device where its center of mass is not at a geometric center. In such an example, a case may be weighted to effectively adjust the center of mass, for example, to coincide with a geometric center, which may be a geometric center of a display. In such an example, where circuitry can render information to a display, the rendered information may rendered in a manner to appear "stationary" (e.g., in a reference frame that allows for viewing while the device is rotating). Such an approach may act to reduce "jitter" as the device rotates (e.g., about an axis determined by a projection, etc.). As an example, a recess of a turntable may be positioned to center a display of a device about a geometric center of the display such that a graphic (e.g., or graphics) rendered to the display may appear relatively "stationary" (e.g., with minimal wobble or jitter).

As an example, an optimization may be performed using information about a device (e.g., geometry, mass distribution, center of mass, etc.) to generate a model of a case that may be constructed for the device (e.g., a case that can "balance" a device with respect to a rotational axis, etc.).

Figure 14:
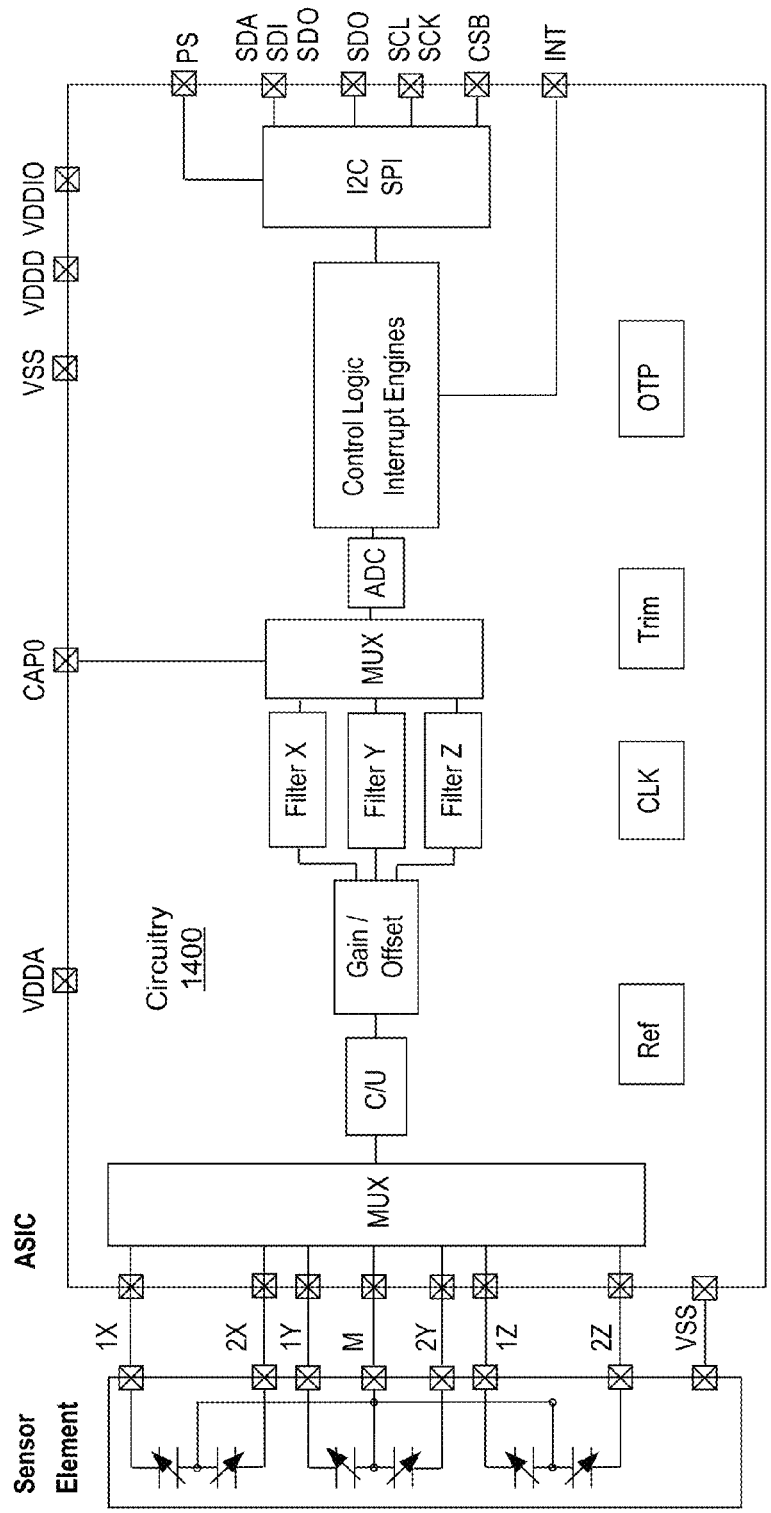
FIG. 14 illustrates circuitry.

FIG. 14 shows an example of circuitry 1400 that includes motion sensing circuitry. In particular, a sensor element is shown that includes x, y and z sensing circuits, which may be accelerometer circuits. As an example, the x, y and z sensing circuits may correspond to x, y and z coordinates, for example, as illustrated in FIGS. 2 and 3. As an example, a coordinate system may define yaw, roll and pitch. As an example, yaw may be defined to be planar motion (e.g., rotation) and roll and pitch may be defined to be motion that tilts a plane (e.g., a geometrical plane), which may be a plane defined at least in part by an electronic device, for example, as supported by a projection. As an example, an electronic device may be supported by a projection where the electronic device may be at an angle (e.g., an offset angle) with respect to horizontal when it is not rotating about an axis defined by the projection. As an example, upon rotation about an axis, the electronic device may sweep a geometrical plane that includes a thickness along the axis (e.g., consider a bit of wobble out of a plane, etc.). In such an example, circuitry may process information from motion sensing circuitry according to, for example, yaw, roll and pitch, to "standardize" the information in a manner that may compensate for an offset angle (e.g., which may be a slight angle of less than about 10 degrees), wobble, jitter, etc.

As an example, where an electronic device includes a display, information may be rendered to the display in a manner where at least a portion of the information appears stationary even where the electronic device is being rotated (e.g., clockwise and/or counter-clockwise).

As shown in the example of FIG. 14, the circuitry 1400 may include an $I^2C$ interface and/or an SPI interface (e.g., which may operate via receipt and/or transmission of information via one or more busses). As an example, the circuitry 1400 may include signal processing circuitry such as one or more amplifiers, multiplexers, filters, analog-to-digital converters (ADCs), control logic, interrupt engines, etc. As an example, motion sensing circuitry may include an ASIC that is operatively coupled to one or more sensor elements. In such an example, signals generated by a sensor element may be processed and, for example, transmitted as information via one or more interfaces, one or more busses, etc. As an example, a processor that can execute an application in an operating system environment may receive such information, process at least a portion of the information and transmit information to control media player circuitry, which may include audio codec circuitry and, for example, digital mixer circuitry.

Figure 15:
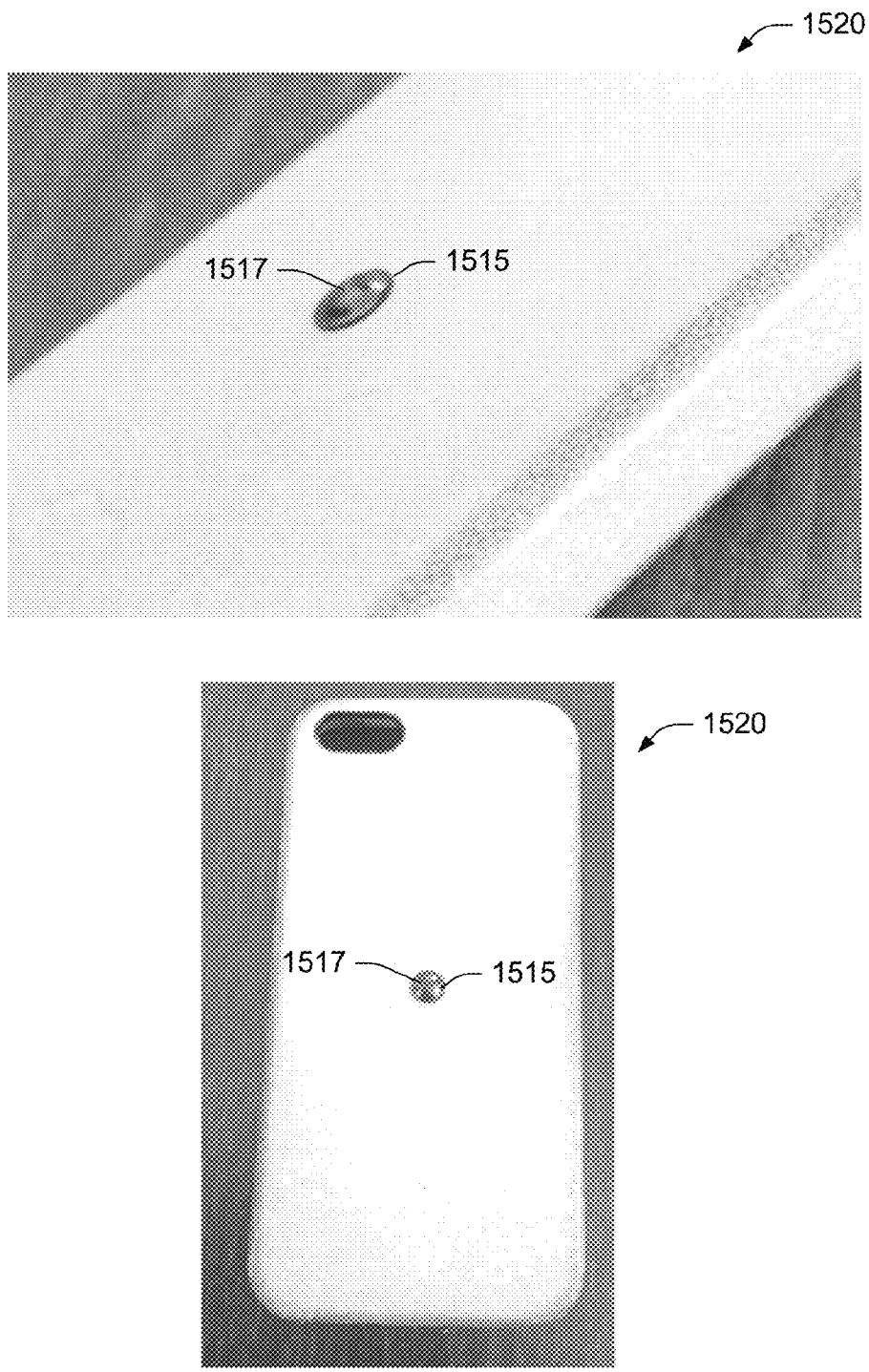
FIG. 15 illustrates an example of a case that includes an example of a projection.

FIG. 15 shows an example of a case 1520 that includes an example of a projection 1515 that includes a point 1517 that can define an axis of rotation of the case 1520.

Figure 16:
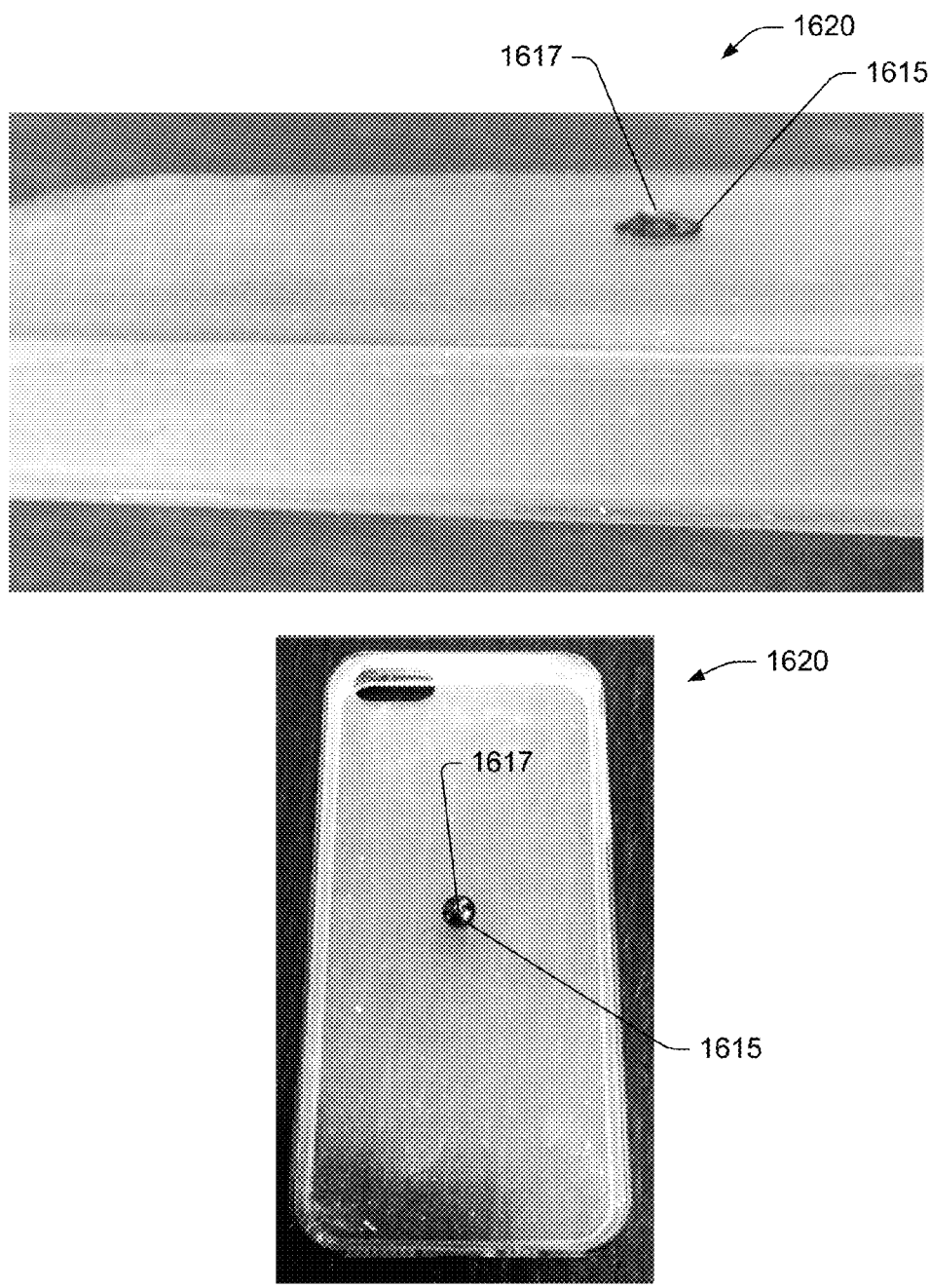
FIG. 16 illustrates an example of a case that includes an example of a projection.

FIG. 16 shows an example of a case 1620 that includes an example of a projection 1615 that includes a point 1617 that can define an axis of rotation of the case 1620. In the example of FIG. 16, the case 1620 is translucent.

Figure 17:
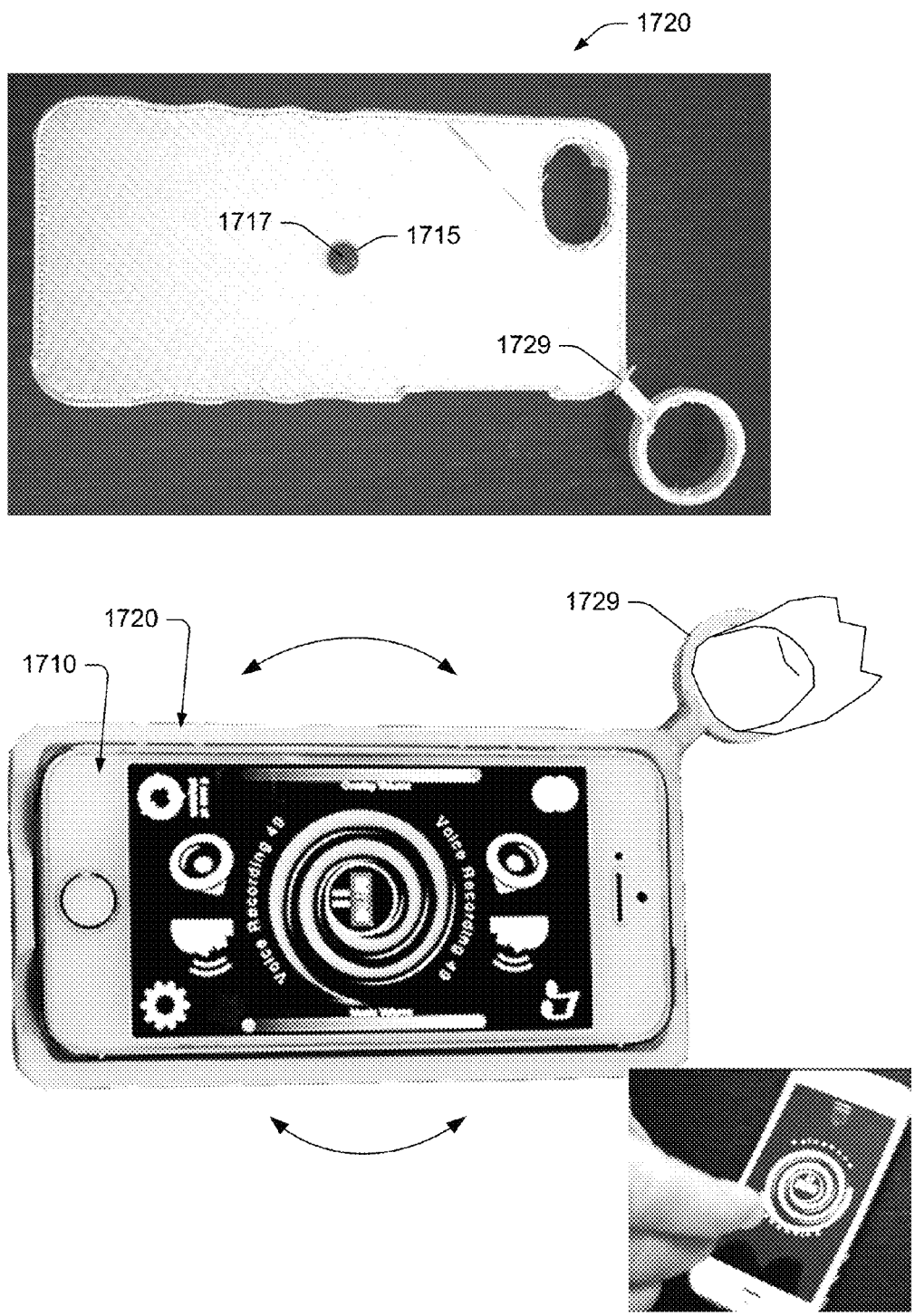
FIG. 17 illustrates an example of a case that includes an example of a projection.

FIG. 17 shows an example of a case 1720 that includes an example of a projection 1715 as well as an example of a handle 1729, which may be used to carry a case and a device 1710 and/or to rotate (e.g., spin the case 1720 and the device 1710).

As shown, the handle 1729 can extend from a corner of the case 1720 and can include a loop or other structure that can allow a finger to contact the handle 1729 and spin the case 1720 (e.g., with the device 1710 therein) rotationally about an axis defined by the projection 1715. The handle 1729 can be of a shape that allows for a 360 degree rotation of the case 1720 about an axis of rotation where multiple revolutions may be made. As an example, a loop can be of a diameter that allows for rotation of the handle 1729 about a finger as a finger is moved in a circular motion at a radius about the axis of rotation of the case 1720. While a handle extending from a corner is illustrated, a handle or handles may extend from one or more other portions of a case that can be operatively coupled to a device such as, for example, a smart phone.

As an example, a case may be constructed with a geometry and weight distribution (e.g., an optionally a projection) that can act to shift a center of mass of a device that is received by the case.

As an example, a method can include sensing acceleration, adjusting one or more parameters of audio circuitry and rendering audio data via the audio circuitry. For example, the acceleration may be acceleration associated with rotation that causes one or more directional acceleration sensing circuits of a rotated accelerometer to experience force. In such an example, a rotation direction (e.g., clockwise or counter-clockwise) may be determined and used to adjust a playback direction parameter (e.g., to render audio data in a forward direction or in a reverse direction).

As an example, a method can include determining an axis of rotation of a device and rendering a graphic to a display of the device such that the graphic can be centered on the axis of rotation such that the graphic can be made to appear "stationary" when the device is rotating about the axis. For example, consider sensing information via an accelerometer (e.g., or accelerometers, gyroscope(s), etc.) and based on the sensed information determining a center of rotation (e.g., an axis about which the device rotates or about which a display of the device rotates). In such an example, graphics rendered to the display (e.g., via a graphics module, OpenGL, etc.) may be centered about the determined center of rotation. Where a graphic includes text, such an approach may allow the text to be more legible to a user or users while the device is rotating (e.g., where the text is controlled to appear "stationary").

As an example, a method can include sensing acceleration and adjusting one or more parameters of illumination circuitry. For example, the acceleration may be acceleration associated with rotation that causes one or more directional acceleration sensing circuits of a rotated accelerometer to experience force. In such an example, a rotation direction (e.g., clockwise or counter-clockwise) may be determined and used to adjust a flash parameter (e.g., that triggers a flash, sets intensity of a flash, synchronizes a flash with an audio signal, etc.).

As an example, a method can include altering audio using sensed information associated with acceleration, direction, velocity, orientation for one or more durations of time. In such an example, the method may include recording altered settings and/or altered audio and, for example, setting one or more loops that may be implemented, for example, by actuating a graphical control such as a playback control (e.g., playback button). As an example, during looping, a method may include playing one or more new audio files, which may be controlled via gesture input (acceleration, direction, velocity, orientation), for example, on top of the looping audio. Such an approach may be referred to as layering, for example, where separate audio may be layered to include a number of sounds playing over one another. As an example, on top of audio layers a new audio layer may be added that is actively affected by the rotation, direction, velocity, and orientation of an electronic device seated in a turntable.

As an example, a device can include a processor; memory operatively coupled to the processor; a display operatively coupled to the processor; motion sensing circuitry operatively coupled to the processor; and a planar surface that includes a projection where the projection defines an axis of rotation of the device. In such an example, the device can include one or more modules stored in the memory where the one or more modules include processor-executable instructions to instruct the device based at least in part on output of the motion sensing circuitry.

As an example, a projection can be or include a spherical cap. As an example, a projection can include a base, which may be planar and an extended part that includes a substantially dome shaped portion that can define an axis of rotation.

As an example, a projection can include a maximum height in a direction normal to a plane defined by a planar surface where the maximum height corresponds to a contact point that defines an axis of rotation.

As an example, a case, a device, a projection, etc. can include an adhesive that adheres a projection to a surface, which can be a planar surface (e.g., of a case, a device, etc.).

As an example, a projection may be a removable projection. For example, a projection can include a material that is "sticky" and reusable such that the projection can be adhered, removed and re-adhered. As an example, a projection can be magnetic such that it is attracted to a case, a device, etc. via magnetic force.

As an example, a projection can be adhered to a planar surface by an adhesive.

As an example, a device can include a touch sensitive display. As an example, a display can include a planar surface where the planar surface of one side of the device is substantially parallel to the planar surface of the display.

As an example, a planar surface of a display of a device and an opposing planar surface of the device can define a thickness of the device. In such an example, motion sensing circuitry can be disposed between the planar surface of the display and the planar surface.

As an example, a device can include wireless communication circuitry. As an example, motion sensing circuitry of a device can output information responsive to clockwise and counter-clockwise rotation of the device about its rotational axis, for example, defined by a projection that projects from a substantially planar surface of the device or a case in which the device is operatively coupled thereto. As an example, a case can include a handle that may facilitate rotation of the device therein about an axis defined by a projection of the case (e.g., or of the device). As an example, a case can include an opening where a device includes a projection that can extend through the opening.

As an example, a device can be a smart phone that includes at least one accelerometer (e.g., or gyroscope, etc.).

As an example, a case can be included in an assembly where a device can be received by the case and where the case includes a planar surface that includes a projection that defines an axis of rotation for the assembly.

As an example, a case can include a recess dimensioned for receipt of a smart phone; and a planar surface that includes a projection that defines a rotational axis of the case. In such an example, the projection can be or include a spherical cap. As an example, a projection of a case can include a maximum height in a direction normal to a plane defined by a planar surface of the case where the maximum height corresponds to a contact point that defines an axis of rotation of the case. As an example, an adhesive can be used that adheres a projection to the planar surface. As an example, a projection can be integral to a case. As an example, a projection can be integral to a device such as, for example, a smart phone.

Although various examples of methods, devices, systems, designs, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, designs, etc.

What is claimed is:

1. A spinning top device comprising:
a processor;
memory operatively coupled to the processor;
a planar display operatively coupled to the processor;
motion sensing circuitry operatively coupled to the processor; and a planar surface, parallel to the planar display, that comprises a projection as a tip of the spinning top device, wherein the projection defines an axis of rotation of the spinning top device in a multiple revolution spinning state of the spinning top device as supported by the projection and as balanced on the projection due at least in part to inertia of the spinning top device, wherein the spinning top device comprises a smart phone that comprises at least the processor, the memory, the planar display and the motion sensing circuitry.

2. The spinning top device of claim 1, comprising one or more modules stored in the memory wherein the one or more modules comprise processor-executable instructions to instruct the spinning top device based at least in part on output of the motion sensing circuitry.

3. The spinning top device of claim 1, wherein the projection comprises a spherical cap.

4. The spinning top device of claim 1, wherein the projection comprises a maximum height in a direction normal to a plane defined by the planar surface and wherein the maximum height corresponds to a contact point that defines the axis of rotation.

5. The spinning top device of claim 1, comprising an adhesive that adheres the projection to the planar surface.

6. The spinning top device of claim 1, wherein the projection is removable.

7. The spinning top device of claim 6, wherein the projection is adhered to the planar surface by an adhesive.

8. The spinning top device of claim 1, comprising a touch sensitive display.

9. The spinning top device of claim 1, wherein the planar display and the planar surface define a thickness of the spinning top device.

10. The spinning top device of claim 9, wherein the motion sensing circuitry is disposed between the planar display and the planar surface.

11. The spinning top device of claim 1, comprising wireless communication circuitry.

12. The spinning top device of claim 1, wherein the motion sensing circuitry outputs information responsive to clockwise and counter-clockwise rotation of the spinning top device about its rotational axis.

13. The spinning top device of claim 1, comprising a case wherein the planar surface is a surface of the case.

14. A spinning top case comprising:
   a recess dimensioned for receipt of a smart phone that comprises a planar display; and
   a planar surface that comprises a projection as a tip of the spinning top case that defines a rotational axis of the spinning top case, wherein, in a received state of the smart phone in the recess of the spinning top case, the planar surface is parallel to the planar display and, in a multiple revolution spinning state about the rotational axis, the spinning top case and the smart phone are supported on the projection and balanced on the projection due at least in part to inertia of the smart phone.

15. The spinning top case of claim 14, wherein the projection comprises a spherical cap.

16. The spinning top case of claim 14, wherein the projection comprises a maximum height in a direction normal to a plane defined by the planar surface and wherein the maximum height corresponds to a contact point that defines the axis of rotation.

17. The spinning top case of claim 14, comprising an adhesive that adheres the projection to the planar surface.

18. The spinning top case of claim 14, wherein the projection is integral to the spinning top case.

19. The spinning top device of claim 1, wherein the projection defines the axis of rotation of the spinning top device about a geometric center of the planar display of the spinning top device.

20. The spinning top device of claim 1, wherein the planar surface is a planar surface of the smart phone.

* * * * *